United States Patent [19]
Belart et al.

[11] Patent Number: 4,598,955
[45] Date of Patent: Jul. 8, 1986

[54] SLIP CONTROL SYSTEM MASTER CYLINDER WITH PISTON SLEEVE

[75] Inventors: Juan Belart, Walldorf; Jochen Burgdorf, Offenbach-Rumpenheim, both of Fed. Rep. of Germany

[73] Assignee: ITT Industries, Inc., New York, N.Y.

[21] Appl. No.: 630,497

[22] Filed: Jul. 13, 1984

[30] Foreign Application Priority Data

Jul. 14, 1983 [DE] Fed. Rep. of Germany ....... 3325424

[51] Int. Cl.⁴ .................. B60T 8/44; B60T 11/20; B60T 13/58; F15B 7/00
[52] U.S. Cl. ..................................... 303/114; 60/560; 60/562; 60/563; 60/591
[58] Field of Search ................. 60/550, 560, 563, 545, 60/547.1, 562, 576, 577, 591, 589; 303/92, 114, 116

[56] References Cited

U.S. PATENT DOCUMENTS

| | | | |
|---|---|---|---|
| 2,799,140 | 4/1957 | Osborne | 60/563 |
| 3,010,282 | 11/1961 | Jansson | 60/563 |
| 3,093,119 | 6/1963 | Stelzer | 60/550 X |
| 3,306,043 | 2/1967 | Kellogg et al. | 60/550 |
| 3,327,479 | 6/1967 | Harness et al. | 60/550 |
| 3,899,889 | 8/1975 | Swanson et al. | 60/550 X |
| 4,244,185 | 1/1981 | Belart | 60/576 X |
| 4,265,087 | 5/1981 | Peeples | 60/550 X |
| 4,311,085 | 1/1982 | Runkle | 60/547.1 X |
| 4,422,293 | 12/1983 | Ewald | 60/560 X |
| 4,483,144 | 11/1984 | Steffes | 60/562 X |
| 4,492,082 | 1/1985 | Belart | 60/589 |
| 4,514,982 | 5/1985 | Bach et al. | 60/562 |
| 4,521,061 | 6/1985 | Belart et al. | 60/547.1 X |

FOREIGN PATENT DOCUMENTS

| | | | |
|---|---|---|---|
| 733001 | 4/1966 | Canada | 60/545 |
| 2164934 | 8/1973 | Fed. Rep. of Germany | 60/563 |
| 996446 | 6/1965 | United Kingdom | 60/550 |

Primary Examiner—Robert E. Garrett
Assistant Examiner—George Kapsalas
Attorney, Agent, or Firm—James B. Raden; Donald J. Breh

[57] ABSTRACT

An actuating device for a vehicle hydraulic brake system of the type having electromagnetically operated valves in the hydraulic circuits to each wheel brake for providing slip control wherein the device includes a master cylinder having a brake pedal force responsive hydraulic booster piston for actuating a master cylinder piston slidably mounted within a slidable positioning sleeve within the bore of the master cylinder. The positioning sleeve is adapted to be mechanically coupled to the booster piston in the brake actuation direction. A stationary projection on the interior end of the master cylinder protrudes into the positioning sleeve and cooperates with the sleeve and master cylinder piston to vary the master cylinder volume. A hydraulic changeover valve directs pressurized fluid during operation of the slip-control valves to the positioningsleeve in opposition to the actuating force to reset the brake pedal and supply pressurized fluid to the wheel brake lines to replenish fluid depleted during operation of the slip control cycle.

9 Claims, 2 Drawing Figures

SLIP CONTROL SYSTEM MASTER CYLINDER WITH PISTON SLEEVE

BACKGROUND OF THE INVENTION

The present invention relates to an actuating device such as the master cylinder for a vehicular hydraulic brake system with slip control, wherein a piston, which is preferably selectively subjected to the pressure of an auxiliary pressurized fluid, is slidably guided in a positioning sleeve, the positioning sleeve being adapted to be coupled with the piston in the direction of actuation and subjected to the auxiliary pressure in opposition to the actuating force.

A device including the characteristics described generally is known from the German printed and published patent application No. 30 40 561.9. This known brake system is comprised, essentially of a hydraulic power booster situated upstream of a master cylinder. In dependence upon the force exerted on the braking pedal, a dynamic pressure is created in the pressure chamber of the hydraulic power booster which is directed to a first brake circuit and displaces, the booster piston in the direction of actuation so that the working chambers of the master cylinder and/or the other brake circuits are pressurized as well.

At the pedal-remote end of the booster piston, an intermediary piston is formed, which is slidably guided within a positioning sleeve and which has a stop which abuts on the sleeve after a specific pedal travel, thus preventing a further axial displacement of the booster piston in the direction of actuation.

In the brake circuits of the brake system described above, electromagnetic valves are arranged, which are controllable through the intermediary of slip control electronics, and by means of which the braking pressure can be held constant or reduced in dependence upon the control signals of the control electronics. In such a control cycle, the pedal-remote annular surface of the positioning sleeve is simultaneously acted upon by the pressure prevailing in the booster chamber, the positioning sleeve being thus displaced in opposition to a pressure spring in the direction of the braking pedal. A reset of the braking pedal is achieved as soon as the positioning sleeve abuts against the stopo f the intermediary piston. In this manner, the master cylinder travel is limited to a certain value so that even in the event of a failure of the energy supply, a sufficient pressure fluid volume is always contained in the working chambers of the master cylinder, thus allowing easily for an emergency actuation of the brake system without power assistance.

The relatively large overall length of the brake system described above is not a preferable form, the overall length being in part due to the intermediary piston required, which is arranged between the booster piston and the master cylinder piston.

SUMMARY OF THE INVENTION

It is therefore, an object of the present invention to improve an acutating device of the type generally described in which a considerable reduction of the overall length is achieved with the aid of simple structural change.

According to the present invention, this object is achieved in that there is provided a master cylinder piston assembly having a two-piece design in that one part of the piston is affixed to the inner surface of one end of the master cylinder and protrudes into the generally tubular-shaped positioning sleeve, and the other part of the piston is operable by a booster piston and sealingly slides within the positioning sleeve toward the stationary first piston part such that a chamber of varying volume is defined and which is associated with at least one wheel brake.

The piston portion which slides in the positioning sleeve takes an active role in the generation of pressure applied to the wheel brake. When the brake is actuated, the slidable piston part moves toward the stationary part reducing the chamber volume within the positioning sleeve. The positioning sleeve during initial movement of the slidable piston part remains stationary in the housing. However, after a predetermined amount of actuating travel of the slidable piston part, the booster piston contacts the positioning sleeve thereby coupling the positioning sleeve and slidable piston part together so that the two move together as a unit. As the position sleeve moves, the stationary piston part is progressively positioned further within the sleeve while the sliding piston part simultaneously advances toward the stationary part progressively reducing the chamber volume causing a corresponding pressure increase.

If the present invention is to be used in a dual-circuit brake system, wherein a first brake circuit is connected to the pressure chamber of the hydraulic power booster and a second brake circuit is connected to the chamber between the two piston members, the pedal-remote piston member preferably bears against the housing in axial direction. For that purpose, a pressure spring is inserted between the piston members which maintains the pedal-remote piston member in abutment with the housing, and which also adjusts a defined inoperative position of the pedal-near piston member. In a preferred embodiment of the actuating device, the piston members are provided with diameters of equal sizes although it would be easily conceivable to have piston members with different diameters, as a result of which a different travel-pressure characteristic curve of the actuating device could be achieved.

If, however, the invention is to be used in a three-circuit brake system, wherein a first brake circuit is dynamically supplied by the pressure chamber of the hydraulic power booster and two additional brake circuits are acted upon by static pressure, the invention favorably provides that the piston part, which is remote from the pedal, bears against the housing through the intermediary of a pressure spring and confines another chamber of varying volume, which is associated with a wheel brake. Such an embodiment results in an actuating device with a tandem master cylinder which, compared to known designs, is also characterized by a considerably shorter overall length. Another working chamber of the master cylinder is pressurizable via the pedal-remote piston part, which is now movable, so that a three-circuit brake system with one dynamic and two static brake circuits can be put into practice in a simple manner.

In another advantageous improvement of the present invention, the positioning sleeve is elastically preloaded into a pedal-near position by means of a pressure spring. For that purpose, the positioning sleeve is provided with a smaller-external diameter portion in which the pressure spring is arranged. A particularly simple construction is further achieved with the pressure spring bearing against a spring plate formed at the positioning sleeve, and an annular body formed fast with the housing, the annular body forming with the larger-external diameter portion of the positioning sleeve a chamber of varying volume. In a further embodiment of the actuating device, this chamber is connected to the pressurized surface of the positioning sleeve via a throttling channel. Thus, the movement of the positioning sleeve directed towards the braking pedal will not take place abruptly in the event of a pressurization of its annular surface. The movement will occur with a certain delay because application of pressurized fluid to the entire annular surface of the positioning sleeve is delayed due to the introduction of the pressurized fluid into the chamber between the annular body and the larger-diameter portion of the positioning sleeve via a throttling channel. In addition, the annular body includes a sealing cup acting as a non-return valve which is adapted to be opened to the chamber of varying volume ensuring that the movement of the sleeve in the direction of actuation is not hindered by a major resistance.

BRIEF DESCRIPTION OF THE DRAWINGS

The invention will be described in greater detail by reference to the following drawings, of which.

DETAILED DESCRIPTION OF THE DRAWING

Figure 1:
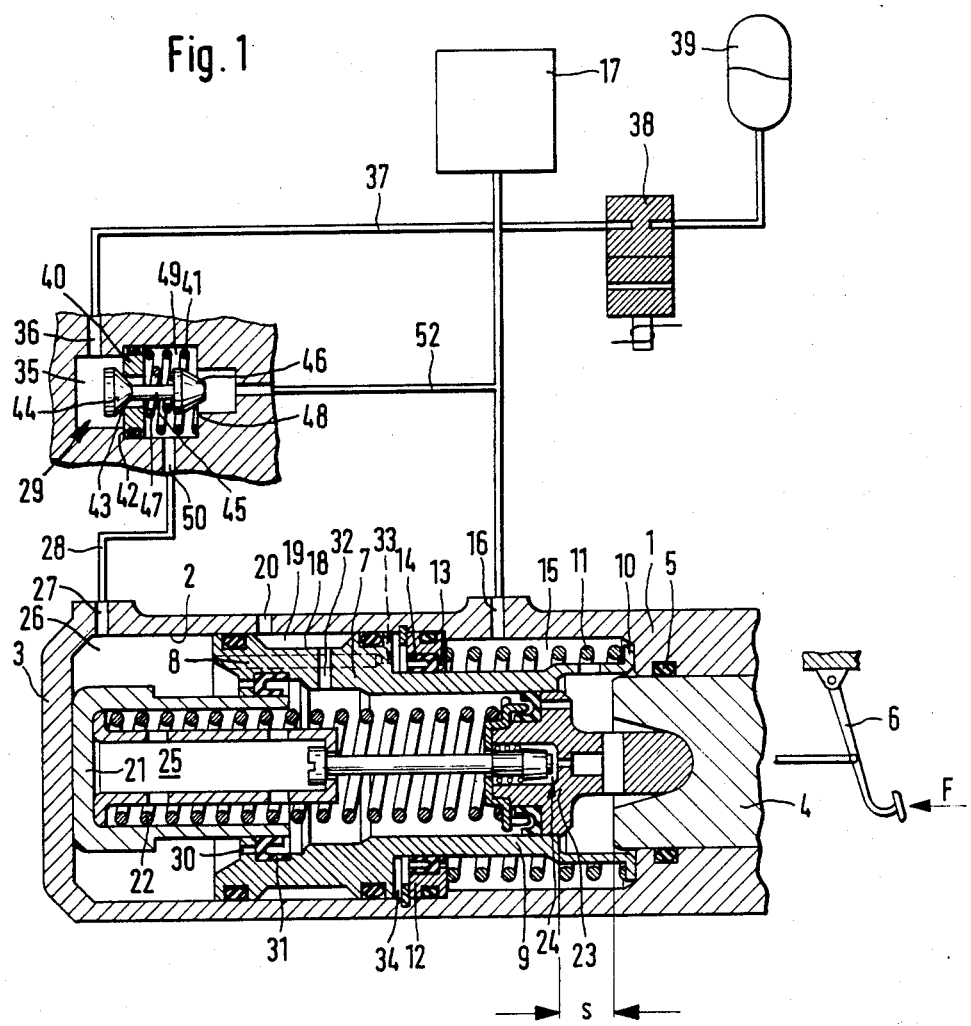
FIG. 1 is a schematic drawing partiallly in section showing an actuating device employing our invention with a simple master cylinder.

In FIG. 1, reference numeral 1 designates a master cylinder housing, wherein a cylinder bore 2 is arranged. The left-hand end of the master cylinder housing 1, as shown in the drawing, is sealed by a housing botom 3. A booster piston 4 protrudes into the right-hand end of the master cylinder housing, as shown in the drawing the piston being surrounded by a sealing ring 5. The end face of the booster piston 4 (showing a broken away coupling to a braking pedal 6) faces a booster chamber, (not shown) wherein hydraulic pressure corresponding to the respective actuating force F applied to the braking pedal 6 can be built up.

In the cylinder bore 2 of the master cylinder housing 1, a positioning sleeve 7 is guided, the sleeve being comprised of a larger-diameter portion 8 and a portion 9 whose external diameter is reduced. The right-hand end of the positioning sleeve 7, as shown in the drawing, constitutes a spring plate 10, against which a pressure spring 11 bears. The pressure spring 11 bears, at its other end against an annular body 12, which is comprised of passages 13 and a sealing cup 14. The portion 9 of the positioning sleeve 7 thus forms together with the master cylinder housing 1 and the annular body 12 a peripheral annular chamber 15, which houses the pressure spring 11 and which is permanently connected via a housing connection 16 and corresponding pressure conduits to an unpressurized supply reservoir 17.

The left end portion 8 of the positioning sleeve 7 has an annular groove 18, which constitutes together with the housing 1, a peripheral annular chamber 19. The peripheral annular chamber 19 is connected to a wheel brake (not shown) via a housing connection 20.

A piston part or member 21 abuts against the housing bottom 3 of the master cylinder housing 1, the piston part being held in abutment with the housing bottom 3 by means of a pressure spring 22. The pressure spring 22, in turn, is supported on the second piston part or member 23 which bears, mechanically, against the booster piston 4. At the piston part 23, a central valve 24 is further arranged, which establishes communication between the unpressurized supply reservoir 17 and the working chamber 25 of the actuating device in the inoperative braking position (as shown), and which interrupts this communication once the piston part 23 has covered a predetermined travel in the direction of actuation.

The left-hand annular surface of the positioning sleeve 7, as shown in the drawing, constitutes together with the piston part 21 and the master cylinder housing 1 a chamber 26 of varying volume from which a housing connection 27 and a pressure conduit 28 lead to a change-over valve 29. The portion 8 of the positioning sleeve 7 in contact with the piston part 21, is also provided with passages 30 and a sealing cup 31, the sealing cup 31 constituting together with the passages 30 a non-return valve, which is adapted to be opened from the chamber 26 to the working chamber 25 of the actuating device. The positioning sleeve 7 furthermore has a radial channel 32, which establishes communication between the working chamber 25 and the peripheral annular chamber 19. From the chamber 26, a throttling channel 33 leads to a chamber 34, which is mainly confined by the positioning sleeve 7, the master cylinder housing 1 and the annular body 12.

The change-over valve 29 incorporates an inlet chamber 35, which is connected to an electromagnetically switchable two-way/two-position valve via a housing connection 36 and a pressure conduit 37. A pressure source 39 is connected to the valve 38. In the simplest case, the pressure source is a pressure chamber of the hydraulic power booster, the pressure chamber being confined by the booster piston 4. In the inoperative position of the brake system (as shown), the valve 38 is in a closed position in which the pressure source 39 is hydraulically separated from the inlet chamber 35 of the valve 29. In the event of a corresponding actuation of the valve 38, however, communication between the pressure source 39 and the inlet chamber 35 of the valve 29 is established.

In the valve 29, an annular piston 40 is guided, which is normally held in abutment with a housing stop 42 by means of a pressure spring 41. The annular piston 40 has a valve seat 43, which together with a valve closing member 44 on a change-over piston defines a first valve passage. The change-over piston includes another closing member 46 connected to the closing member 44 by an intermediary extension 45 of the piston.

The closing member 46 and a valve seat 48 define a second valve passage. The closing member 44 is preloaded normally closed in the inoperative position illustrated in FIG. 1 by opposing compression springs 47 and 41. Spring 41 preloads the annular piston 40 against the housing stop 42 and the spring 47 preloads the closing member 44 against the seat 43 on the annular piston. As shown in FIG. 1, the valve defined by members 46 and 48 is maintained normally open in the inoperative position illustrated due to the design length of intermediary extension 45 maintaining the pressure in the chamber 26 at atmospheric pressure of the reservoir 17 together with a valve closing member 44 of a change-over piston. At the valve closing member 44 another closing member 46 is shaped through the intermediary of an extension 45, the closing member 46 being pre-loaded into the closed position of the valve passages 43 and 44, in the illustrated inoperative position, by means of a pressure spring 47. The valve closing member 46 forms together with a valve seat 48 another valve passage. The chamber of the change-over valve 29 incorporating the springs 41 and 47 constitutes the outlet chamber 49, which is in communication with the chamber 26 of the actuating device via a housing connection 50 and the pressure conduit 28. The change-over valve 29 includes a housing connection, which communicates with the unpressurized supply reservoir 17 and/or the peripheral annular chamber 15 of the actuating device via a pressure conduit 52.

The mode of operation of the brake system illustrated in FIG. 1 will be explained in more detail herinbelow, starting from an inoperative braking position in which all movable parts are in the position shown in the illustration.

When an actuating force F, as shown by the arrow, is exerted on the braking pedal 6, a pressure proportionate to the actuating force is built up in the pressure chamber of the hydraulic power booster via a brake valve, which is not shown, the pressure acting upon the pedal-near end face of the booster piston 4. At a certain pressure level in the pressure chamber of the hydraulic power booster, the booster piston 4 finally moves in the direction of actuation and displaces at the same time the piston part 23 in opposition to the force of the pressure spring 22 in the direction of actuation, the central valve 24 being closed, as a result of which hydraulic communication between the working chamber 25 of the actuating device and the unpressurized supply reservoir 17 is interrupted. When the piston 23 is further displaced, a reduction of the volume of the working chamber 25 of the actuating device sets in, thus building up hydraulic pressure in the working chamber 25, which propagates via the radial channel 32 in the positioning sleeve 7, through the peripheral annular chamber 19 and the housing connection 20 to the wheel brake associated with the housing connection 20. At the beginning of the brake actuation, the positioning sleeve first stays in its initial, at rest axial position, as shown in FIG. 1, since atmospheric pressure has been established in the chamber 26 of the actuating device via the change-over valve 29, and the pressure spring 11 has been dimensioned such that it will be able to offset the friction forces transmitted via the piston part 23 onto the positioning sleeve.

After the booster piston 4 and/or the piston part 23 has moved in the direction of actuation by a predetermined travel, as determined by the dimensions of the device, the booster piston 4 abuts against a shoulder of the positioning sleeve 7 and shifts the latter together with the piston part 23 further in the direction of actuation. The volume of the working chamber 25 is further reduced and the pressure at the connection 20 of the actuating device is further increased. During such a brake actuation, the piston part 21 does not alter its axial position but bears against the housing bottom 3 of the master cylinder housing via the pressure spring 22. If the hydraulic pressure in the wheel brake connected to the housing connection 20 of the actuating device has now increased such that critical slip values occur at the respective wheel brake so as to initiate a control cycle of the brake system's slip control device, first the communication between the housing connection 20 and the wheel brake is interrupted, in a known manner, by means of an electromagnetic valve (not shown) in the brake line leading from the connection 20 to the wheel brake, as a result of which the pressure in the wheel brake will remain constant. Usually, the wheel brakes are provided with additional electromagnetic valves through which pressure medium is dischargeable from the wheel brake, as a result of which the brake pressure will decrease and a renewed acceleration of the wheel will be possible.

In order to prevent an exhaustion depletion of the fluid volume contained in the working chamber 25 of the actuating device due to operation of the slip control cycle, the valve 38 is switched over at the beginning of a control cycle, thus establishing hydraulic communication between the pressure source 39 and the inlet chamber 35 of the change-over valve 29. Pressurized fluid enters the chamber 35, and the annular piston 40 and the change-over piston are displaced to the right in opposition to the force of the spring 41. The valve passage defined by the seat 43 and the member 44 remains closed until the valve closing member 46 finally abuts against the valve seat 48 and closes communication between the housing connection and the chamber 49 of the change-over valve which thereby closes communication between the chamber 26 of the actuating device and the unpressurized supply reservoir 17. With the member 46 seated against the seat 48, the change-over piston is incapable of further movement. However, the annular piston 40 continues to move under the influence of the pressurized fluid in the chamber 35 against the force of the spring 41 causing communication between the chamber 35 and the chamber 49 via the passage between the now separated member 44 and the seat 43, thereby allowing the pressure medium to flow from the pressure source 39 via the change-over valve 29 to the pressure conduit 28 into the chamber 26. The pressure medium transmitted to the chamber 26 of the actuating device flows via the passages 30 past the sealing cup 31 to the working chamber 25, and from there via the radial channel 32, through the peripheral annular chamber 19 and the housing connection 20 to the wheel brake, and replenishes the volume of pressure fluid depleted from the wheel brake in the course of operation of a control cycle. At the same time, the pressure medium now present in chamber 26 of the actuating device acts upon the left-hand end face of the positioning sleeve 7 as a result of which a force component is applied to the positioning sleeve 7, which acts in opposition to the respective actuating force. The braking pedal is thereby reset via the booster piston and the sleeve 7 to an extent which is dependent on the pressure prevailing in the chamber 26. This reset action of the booster piston 4 will not occur abruptly, due to the throttling channel 33 and the chamber 34, but will be delayed depending on the cross-section size of the throttling channel 33. The maximum reset effect will occur when the pressure in the chamber 34 of the actuating device equals the pressure prevailing in chamber 26.

Upon completion of a control cycle, the electromagnetically actuatable two-way/two-position valve 38 is switched back to its original position, thus allowing the change-over valve 29 to return to its rest position, as illustrated in the drawing.

Figure 2:
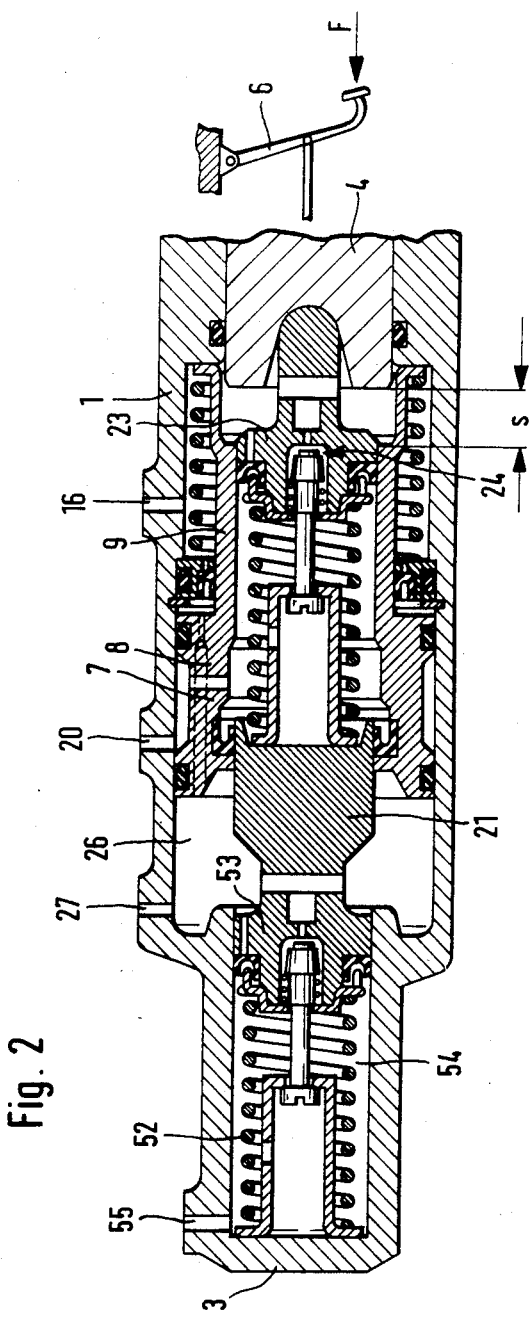
FIG. 2 is a sectional view of an actuating device employing our invention with a tandem master cylinder.

The actuating device as seen in FIG. 2 differs from the one described above only in that the piston part 21 does not bear directly against the housing bottom 3 but bears through the intermediary of an additional pressure spring 52. The pedal-remote end of the piston part 21, as shown in FIG. 2, has been designed as a master cylinder piston 53, through which another working chamber 54 of the actuating device is pressurizable. Thus, additional wheel brakes of a second brake circuit are connectable to a housing connection 55 of the actuating device.

What is claimed is:

1. An actuating device for use in a master cylinder of the type including at least one piston means positionable in response to movement of a brake pedal for pressurizing hydraulic brake fluid in a hydraulic brake system having slip control, including means for supplying auxiliary pressurized hydraulic brake fluid into said master cylinder for replenishing said brake fluid in said brake system and for resetting the position of said piston means during operation of said slip control system comprising:

a housing defining a portion of said master cylinder including a bore therein closed on one end and open at a second end;

a generally tubular positioning sleeve sealingly, slidably mounted within said bore defining at a first annular pressure chamber between said positioning sleeve and said housing adapted to be hydraulically connected to at least one wheel brake of said brake system;

a first piston part sealingly, slidably mounted in said tubular positioning sleeve proximate said open end and including means providing for operatively connecting said first piston part to said brake pedal for movement in an actuating direction in response to movement of said brake pedal;

a generally cylindrical second piston part extending coaxially, partially into said positioning sleeve, said second piston part being sealingly supported at one end in said positioning sleeve and sealingly, slidably supported in a reduced diameter section of said bore, said second piston part supported against said closed end by a compression spring interposed between said closed end and said second piston part, said second piston part, an end of said positioning sleeve and said housing defining said auxiliary pressure chamber and said second piston part and said reduced diameter section of said bore defining a first working chamber having a variable volume adapted to be connected to at least a second wheel brake of said brake system;

said auxiliary pressure chamber adapted to receive said auxiliary pressurized fluid, said positioning sleeve, said piston part and said first piston part defining a second working chamber having a variable volume and being in flow communication with said first annular chamber;

means interconnecting said positioning sleeve to said first piston part at a predetermined position of said first piston part for movement therewith in the actuating direction; and one-way valve means associated with said positioning sleeve interconnecting said auxiliary pressure chamber to said second working chamber providing for flow of said auxiliary fluid into said second working chamber.

2. An actuating device for use in a master cylinder of the type including at least one piston means positionable in response to movement of a brake pedal for pressurizing hydraulic brake fluid in a hydraulic brake system having slip control, including means for supplying auxiliary pressurized hydraulic brake fluid into said master cylinder for replenishing said brake fluid in said brake system and for resetting the position of said piston means during operation of said slip control system comprising:

a housing defining a portion of said master cylinder including a bore therein closed on one end and open at a second end;

a generally tubular positioning sleeve sealingly, slidably mounted within said bore defining at a first annular pressure chamber between said positioning sleeve and said housing adapted to be hydraulically connected to at least one wheel brake of said brake system;

a first piston part sealingly, slidably mounted in said tubular positioning sleeve proximate said open end and including means providing for operatively connecting said first piston part to said brake pedal for movement in an actuating direction in response to movement of said brake pedal;

a generally cylindrical stationary second piston part affixed to said closed end extending coaxially, partially into said positioning sleeve, said positioning sleeve being sealingly, slidably supported by said stationary piston part, said stationary piston part, an end of said positioning sleeve and said housing defining an auxiliary pressure chamber, said auxiliary pressure chamber adapted to receive said auxiliary pressurized fluid, said positioning sleeve, said stationary piston part and said first piston part defining a working chamber having a variable volume and being in flow communication with said first annular chamber;

means for interconnecting said positioning sleeve to said first piston part at a predetermined position of said first piston part for movement therewith in the actuating direction; and one-way valve means associated with said positioning sleeve interconnecting said auxiliary pressure chamber to said working chamber providing for flow of said auxiliary fluid into said working chamber.

3. The actuating device as claimed in claim 2, in which a pressure spring is inserted between the first piston part and the stationary piston part.

4. The actuating device as claimed in claim 2, in which the first piston part and the stationary piston part have equal diameters.

5. The actuating device as claimed in claim 2 further comprising a compression spring biasing said positioning sleeve into a predetermined position and imposing a predetermined preload on said position sleeve in a direction opposite to the direction of actuation.

6. The actuating device as claimed in claim 5, in which the positioning sleeve includes a stepped external surface defining a second annular chamber between said positioning sleeve and said housing, in which the compression spring is arranged.

7. The actuating device as claimed in claim 6, in which the compression spring bear against a spring plate formed on the positioning sleeve and against an annular body formed fast with the housing, said annular body and a larger-external diameter portion of the positioning sleeve forming a second annular chamber of varying volume.

8. The actuating device as claimed in claim 7, in which the second annular chamber of varying volume is connected to the auxiliary pressure chamber by a throttling channel.

9. The actuating device as claimed in claim 7, in which the positioning sleeve carries a sealing cup defining said one-way valve, which is adapted to open to the working chamber of varying volume under the influence of said auxiliary pressurized fluid.

* * * * *